United States Patent Office 3,430,705
Patented Mar. 4, 1969

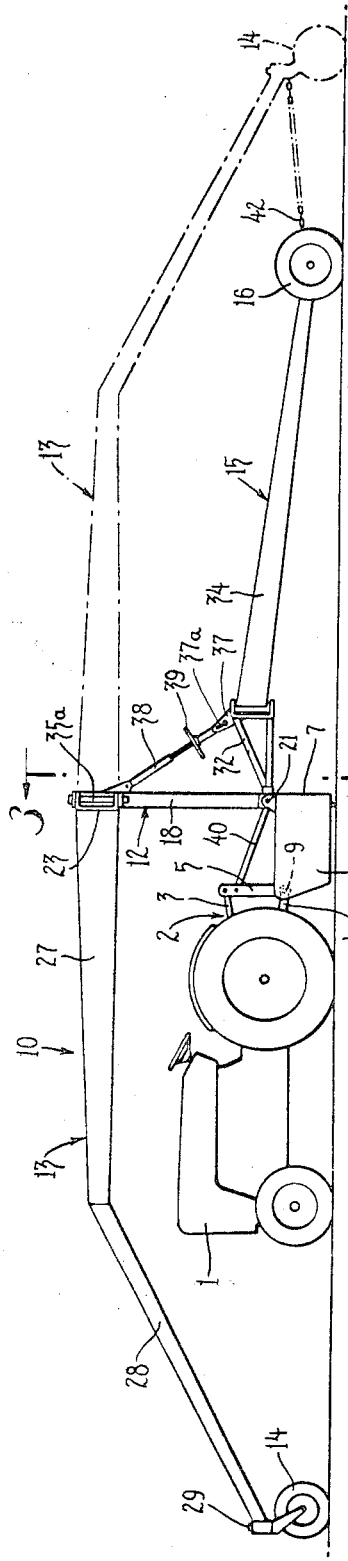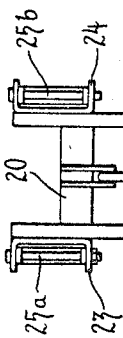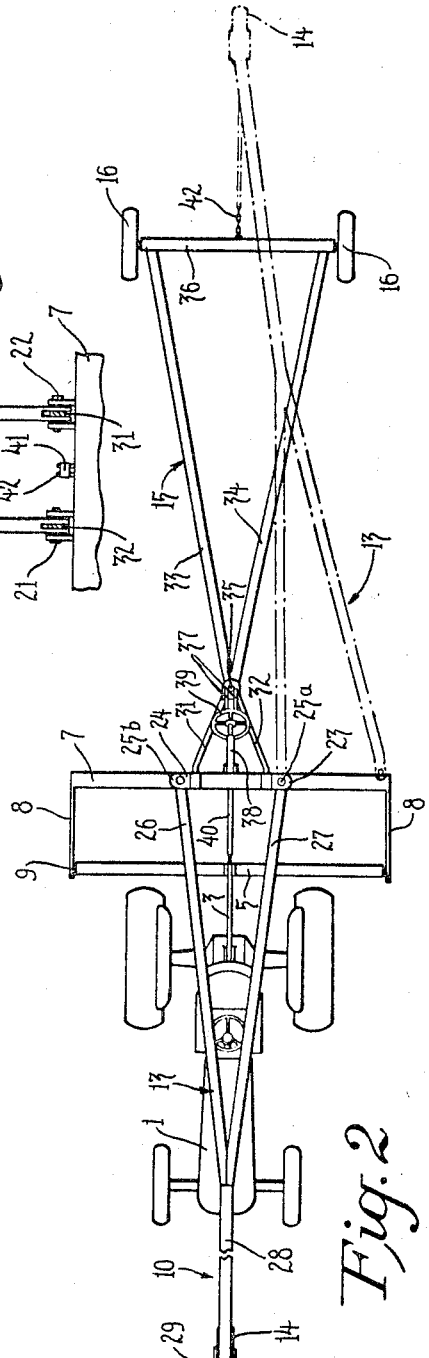

3,430,705
LAND LEVELING IMPLEMENT
Clarence B. Richey, Fresno, Calif., assignor to
Massey-Ferguson Inc., Detroit, Mich.
Filed Feb. 23, 1966, Ser. No. 529,418
U.S. Cl. 172—780                          6 Claims
Int. Cl. E02f 3/12, 3/62, 3/76

ABSTRACT OF THE DISCLOSURE

A land leveling implement for attachment to a tractor comprises forwardly and rearwardly extending wheel supported frame sections interconnected by a central section. The central section pivotally supports a scraper which is connected to the tractor three-point hitch. The implement includes a screw jack for adjustment of ground clearance. The front frame section may be pivoted to the rear for transport and lost motion connections between frame sections and between the implement and tractor enable lifting of the scraper for transport.

---

This invention relates generally to earthworking implements and is particularly concerned with tractor drawn land levelers.

Such implements generally include an elongated frame having wheels at its opposite ends which is drawn by a tractor and has a scraper suspended on the frame. Complex linkage and hydraulic mechanisms are generally required to maintain the proper working depth of the scraper, and the long frame is difficult to transport from place to place between operations.

A tractor drawn land leveler according to a preferred embodiment of the present invention includes an elongated framework having an upright, central frame section suspended between a pair of forwardly and rearwardly projecting frame sections. Gauge wheels are supported on the free ends of the front and rear frame sections. A scraper bucket is supported on the lower end of the central frame member which in turn is supported above the ground by the gauge wheels. The scraper bucket has forwardly projecting side members which are pivotally connected to the tractor hitch at a fixed point above the ground determined by the position of the tractor hitch. During operation the front, rear, and central frame sections are rigidly secured together by a screw jack such that the working depth of the scraper is determined by the position of the gauge wheels and rises and falls relative to the tractor in accordance with vertical movement of the gauge wheels as they move over the ground. For transport, the screw jack is adjusted to raise the lower end of the central frame member and permit the forward end of the bucket to be raised by the tractor hitch. The front gauge wheel arm may then be selectively rotated about the central frame member until it projects to the rear of the tractor and trails behind the tractor.

Other objects, advantages and features of the invention will become apparent from the following description taken in connection with the accompanying drawings in which:

FIG. 1 is an elevational view of a land leveler according to a preferred embodiment of the invention;

FIG. 2 is a plan view of the implement of FIG. 1; and

FIG. 3 is a sectional view taken on line 3—3 of FIG. 1.

Reference numeral 1 designates generally a tractor having a hydraulic three-point hitch 2 including a top link 3 and a pair of lower draft links 4. An A-frame 5 is pivotally mounted on the top and lower links of the tractor.

A bucket type scraper 7 having a pair of forwardly projecting side members 8 is pivotally mounted at the forward ends of the side members to the lower links for pivotal movement about an axis 9. The scraper is supported at its rear end on the framework 10 of a land leveling implement.

The framework 10 includes a central, upright frame section 12, a forward section 13 for a front gauge wheel 14 and a rear frame section 15 for rear gauge wheels 16. The central frame 12 includes a pair of transversely spaced vertical frame members 18 and 19 (FIG. 3) secured together at their upper ends by a transverse frame member 20 and pivotally mounted on the upper edge of the scraper 7 by pivot pins 21 and 22, respectively. Secured to the upper ends of frame members 18 and 19 are brackets 23 and 24, respectively, to which is secured by pins 25a and 25b the rear ends of a pair of forwardly converging horizontal arms 26 and 27, respectively, of the front frame section 13. A beam 28 extends forwardly from the converging ends of arms 26 and 27 with its free end rotatably supporting a spindle 29 about which wheel 14 casters.

The rear frame section 15 includes a front portion having rearwardly converging arms 31 and 32 which terminate in a bracket, and a rear section having a pair of rearwardly diverging arms 33 and 34 connected to the bracket by a pin 35. Extending between the spaced rear ends of arms 33 and 34 is a transverse frame member 36 in which the rear gauge wheels 16 are rotatably mounted. The forward ends of arms 31 and 32 are pivotally connected with the upper edge of scraper 7 as shown in FIG. 3.

For securing the frame sections 12, 13 and 15 together against movement relative to each other, a screw jack 38 has one end pivotally connected to the transverse frame member 20 of the upright frame section 12 and its lower end mounted by a pin in slots 37a in a pair of spaced plates 37 secured to the bracket at the convergence of arms 31 and 32. A hand wheel 39 adjusts the length of the screw jack and thus the minimum angle between the central frame 12 and the rear frame member 15.

A link 40 is pivotally connected at its front end with A-frame 5 above axis 9 and is slideably engaged at its rear end with a bracket 42 on the upper edge of scraper 7. A stop member 41 is formed on the rear end of link 40 to limit the forward sliding movement of link 40 which limits the downward pivotal movement of scraper 7 about the axis 9 of the lower links.

It is apparent that the working depth of the scraper 7 is fixed with respect to gauge wheels 14 and 16, and that the scraper can freely float vertically with respect to the tractor about axis 9. Thus, as either of the gauge wheels 14 and 16 rise or fall in accordance with the changes in the ground contour, the scraper 7 will rise or fall relative to the tractor. Moreover, the tractor can move vertically relative to frame 10 without affecting the working depth of the scraper.

For transport, the slots in plates 37 allows the tractor to lift the scraper relative to the ground for transport by lifting links 4. As links 4 are lifted, stop member 41 engages bracket 42 to prevent downward pivoting of scraper 7 which is then lifted off the ground. Coupling pin 25b is removed to disconnect arm 26 of frame section 13 permitting frame section 13 to be rotated about the axis of pin 25a to a trailing transport position as indicated in phantom lines in FIGS. 1 and 2. Gauge wheel 14 then trails behind the tractor for transport and if desired a chain 42 may be connected between gauge wheel 14 and transport frame member 36 to cause gauge wheel 14 to follow the tractor around sharp turns.

While the scraper bowl is illustrated as being pivotally supported on the tractor links as well as the gauge wheels, the scraper can be supported solely by the gauge wheels with the tractor links floating and serving only as draft members during operation.

While a specific example of the invention has been illustrated and described, it will be apparent to those skilled in the art that various alternative constructions and arrangement of parts can be made without departing from the scope and spirit of the invention.

I claim:
1. A land leveling implement for attachment to a tractor, comprising:
   a scraper,
   an upright central frame section supporting the scraper,
   a rear frame section extending rearwardly of the tractor and terminating in a gauge wheel,
   means interconnecting the rear and central frame sections,
   an elongated front frame section terminating in a gauge wheel,
   means pivotally interconnecting the front and central frame sections, the front frame section being movable between a working position extending over and forwardly of the tractor and a transport position extending rearwardly of the tractor,
   means for locking the front frame section in the working position,
   adjustment means for selectively positioning the scraper relative to the ground, and
   attachment means for attaching the implement to the tractor.

2. A land leveling implement as claimed in claim 1 wherein said attachment means pivotally connects the scraper with the hydraulic hitch of the tractor and further including a link having one end pivotally connected with the tractor hitch at a point spaced above the pivotal axis of said attachment means and its other end slideably connected with the scraper, and stop means on said link for limiting the downward pivotal movement of the scraper relative to the tractor hitch.

3. A land leveling implement as defined in claim 2 wherein said rear section is pivotally connected with the lower end of said central section and the adjustment means include a member selectively extensible and retractable connected between the rear section and central section to restrain the rear and central sections against relative movement.

4. A land leveling implement as defined in claim 3 wherein the means pivotally interconnecting the front and central frame sections include a pair of transversely spaced brackets adjacent the upper end of the central frame section, and said front section includes a pair of arms each of which is pin connected with one of the brackets during earthworking operations, said pin connections restraining the front section against relative movement with respect to the central and rear frame sections but permitting the front frame section to be swung to the rearwardly projecting transport position with respect to the central frame section upon disconnection of one of said pin connections.

5. A land leveling implement as defined in claim 4 wherein said front section is longer than said rear section and the front gauge wheel trails behind the rear gauge wheel in the transport position.

6. A land leveling implement as defined in claim 3 wherein said extensible and retractable member is connected to said rear sections by a lost motion connection permitting the central section to be raised vertically relative to said rear section for transport.

References Cited

UNITED STATES PATENTS

| | | | |
|---|---|---|---|
| 2,411,277 | 11/1946 | Laird et al. | 37—180 |
| 3,103,078 | 9/1963 | Waterson | 37—180 |

ABRAHAM G. STONE, *Primary Examiner.*

STEPHEN C. PELLEGRINO, *Assistant Examiner.*